United States Patent
Kerko et al.

[11] Patent Number: 5,268,335
[45] Date of Patent: Dec. 7, 1993

[54] FAST STRENGTHENING GLASS LENSES

[75] Inventors: David J. Kerko; Josef C. Lapp; David W. Morgan, all of Corning, N.Y.

[73] Assignee: Corning Incorporated, Corning, N.Y.

[21] Appl. No.: 982,562

[22] Filed: Nov. 27, 1992

[51] Int. Cl.$^5$ .................. C03C 3/091; C03C 4/08
[52] U.S. Cl. ........................... 501/66; 501/67; 501/71; 501/905
[58] Field of Search ............... 501/66, 67, 71, 905

[56] References Cited

U.S. PATENT DOCUMENTS

| | | |
|---|---|---|
| 3,010,836 | 11/1961 | Upton et al. |
| 3,790,260 | 2/1974 | Boyd et al. |
| 4,259,118 | 3/1981 | Sack |
| 4,525,462 | 6/1985 | Behr .................. 501/95 X |
| 4,562,161 | 12/1985 | Mennemann et al. |
| 4,565,791 | 1/1986 | Boudot et al. |
| 4,768,859 | 9/1988 | Kasori et al. |
| 4,824,806 | 4/1989 | Yokoi et al. |
| 4,925,814 | 5/1990 | Fine |

FOREIGN PATENT DOCUMENTS 0021830 2/1985 Japan .................. 501/905

Primary Examiner—Karl Group
Attorney, Agent, or Firm—C. S. Janes, Jr.

[57] ABSTRACT

This invention is directed to the production of transparent glasses which can be chemically strengthened within a period of time not exceeding four hours to develop a surface compression layer having a sufficient depth to survive the Drop Ball Test after abrasion, the glasses consisting essentially, in weight percent, of

| | | | |
|---|---|---|---|
| $SiO_2$ | 55–65 | CaO | 0–1.5 |
| $B_2O_3$ | 5–20 | MgO | 0–4 |
| $Al_2O_3$ | 4–10 | $TiO_2$ | 0–4 |
| $B_2O_3 + Al_2O_3$ | 14–26 | $ZrO_2$ | 0–7 |
| $Li_2O$ | 0–3 | $MgO + TiO_2 + ZrO_2$ | 0–10 |
| $Na_2O$ | 6–18 | $As_2O_3$ | 0–0.5 |
| $K_2O$ | 2–10 | ZnO | 0–1.5 |
| $Li_2O + Na_2O + K_2O$ | 13–22. | | |

Where desired, 3.5–5.5% $Fe_2O_3$ may be included to yield glasses which, at a thickness of 2 mm, will not transmit more than 1% of ultraviolet radiation at a wavelength of 380 nm. Where an ultraviolet absorbing glass exhibiting a neutral gray, fixed tint is desired, 0.02–0.035% $Co_3O_4$ and 0.08–0.2% NiO will be added.

4 Claims, 1 Drawing Sheet

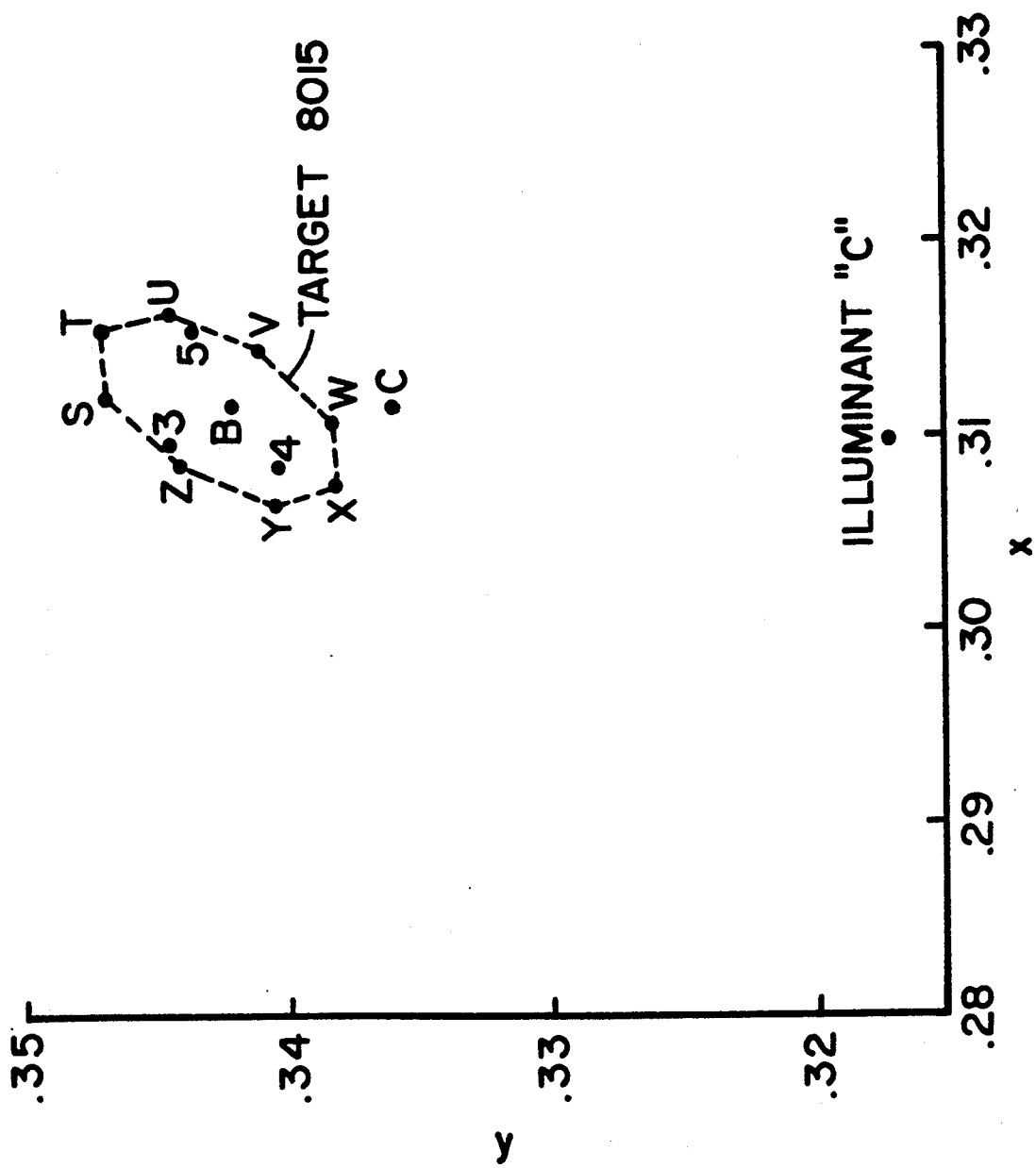

FAST STRENGTHENING GLASS LENSES

RELATED APPLICATION

United States application Ser. No. 07/982,561, filed concurrently herewith in the names of D. J. Kerko and D. W. Morgan under the title NEUTRAL, ULTRAVIOLET ABSORBING, FIXED TINT LENSES, discloses the production of glasses suitable for use as a sunglass exhibiting a fixed tint gray coloration which closely approximates the illuminant, and which limits the transmittance of ultraviolet radiation at a wavelength of 380 nm to no more than 1% at a thickness of 2 mm. The glass compositions described therein may contain low levels of ZnO, the most preferred glasses being essentially free of ZnO, and consist essentially, in weight percent, of

| | | | |
|---|---|---|---|
| $SiO_2$ | 65–72 | CaO | 0–1.5 |
| $B_2O_3$ | 2–6 | $Al_2O_3$ + CaO | 0–1.5 |
| $Na_2O$ | 6–10 | ZnO | 0–1.5 |
| $K_2O$ | 10–16 | $As_2O_3$ | 0–0.3 |
| $Na_2O$ + $K_2O$ | 17–23 | $Fe_2O_3$ | 4.8–6.2 |
| $K_2O:Na_2O$ | 1.25–2.25 | $Co_3O_4$ | 0.012–0.02 |
| $Al_2O_3$ | 0–2.25 | NiO | 0.16–0.21 |

BACKGROUND OF THE INVENTION

Over 20 years ago the Federal Food and Drug Administration (FDA) issued a regulation prescribing a test relating to the mechanical strength of spectacle lenses, as defined in terms of resistance to breakage. That test, termed the "Drop Ball Test" by the glass industry, required that such lenses, in a thickness of 2 mm, must survive the impact resulting from a 0.625" (~1.6 cm) diameter steel ball being dropped from a height of 50 inches (~127 cm). Because annealed lenses are subject to breakage in the FDA test, means were sought to significantly improve the mechanical strengths of the lenses. Two practices have been followed commercially to achieve that need; viz., thermal (air) tempering and chemical strengthening.

Whereas air tempering is a comparatively rapid operation, the process involves relatively high temperatures which may cause distortion of the surface contour of a lens. Furthermore, because glass articles having thicknesses less than about 0.087" (~2.2 mm) are very difficult to air temper effectively, the improvement in strength imparted to lenses has not been as great as would be wished. Moreover, in an effort to reduce the weight of glass lenses, there has been the desire to reduce the thicknesses thereof to less than 2 mm. As can be appreciated, such reduction in lens thickness can further decrease the improvement in impact resistance conferred via thermal tempering.

Chemical strengthening, typically contemplating the exchange of large alkali metal ions from an external source, e.g., $K^+$ ions from a bath of a molten potassium salt, with smaller alkali metal ions, e.g., $Li^+$ and/or $Na^+$ ions, in the surface of a glass article at a temperature below the strain point of the glass to form an integral surface compression layer on the article, can more than double the mechanical strength exhibited by a glass in the annealed state. And, because the surface compression layer developed has a depth of about 0.002"–0.003" (~0.05–0.08 mm) or somewhat greater, the strengthening effect is operable with glass lenses of small thickness dimensions. Unfortunately, however, the ion exchange reaction proceeds relatively slowly.

Table I presents two white crown glasses currently marketed commercially by Corning Incorporated, Corning, N.Y. Corning Code 8361 has been marketed since the 1940s. Corning Code 8092, having a composition within U.S. Pat. No. 3,790,260 (Boyd et al.), was introduced to the market in the 1970s and was designed to exhibit impact resistances greater than Code 8361 after being subjected to chemical strengthening. The composition of each is expressed on the oxide basis both in terms of weight percent and cation percent.

TABLE I

| | Code 8361 | | Code 8092 | |
|---|---|---|---|---|
| | Weight % | Cation % | Weight % | Cation % |
| $SiO_2$ | 67.65 | 61.74 | 62.51 | 57.14 |
| $B_2O_3$ | — | — | 0.95 | 1.50 |
| $Al_2O_3$ | 2.00 | 2.15 | 2.79 | 3.01 |
| $Na_2O$ | 8.00 | 14.16 | 8.39 | 14.87 |
| $K_2O$ | 9.35 | 10.88 | 9.34 | 10.89 |
| MgO | — | — | 2.94 | 4.01 |
| CaO | 8.40 | 8.21 | — | — |
| ZnO | 3.50 | 2.36 | 11.65 | 7.86 |
| $TiO_2$ | 0.40 | 0.27 | 0.73 | 0.50 |
| $As_2O_3$ | 0.10 | 0.06 | 0.10 | 0.06 |
| $Sb_2O_3$ | 0.45 | 0.17 | 0.45 | 0.06 |

Both of those glasses require an immersion in a bath of a molten potassium salt ($KNO_3$) of about 16 hours to obtain a surface compression layer having a depth of about 0.002"–0.003" (~0.05–0.08 mm) with effective mechanical strength A layer of surface compression of that depth has been found to assure that the strengthening effect is not lost when the surface of the glass is subjected to such abuse and abrasion as inevitably occurs in normal service applications.

As was observed in U.S. Pat. No. 3,790,260, supra, the presence of CaO in a glass composition tends to block or otherwise inhibit an ion exchange taking place between $K^+$ and $Na^+$ ions. That circumstance results in a shallower depth of the surface compression layer which, while providing a very sizeable initial improvement in mechanical strength, can lead to a substantial diminution of strength as a consequence of surface abuse. Accordingly, it has been deemed most desirable to avoid any significant level of CaO in glasses to be subjected to chemical strengthening.

As can be recognized, the chemical strengthening operation must be carried out after the lens has been ground and polished to a prescribed prescription. The need for a 16 hour immersion in a bath of molten salt has not been well received by the lens dispensers because it adds the equivalent of about a day to the turnaround time required between receipt of a patient's prescription and return of the finished lenses. Hence, there has been a continuing need for glass compositions suitable for ophthalmic lenses which can be chemically strengthened through ion exchange to yield surface compression layers within a period of no more than four hours and, most preferably, no more than two hours, of sufficient depth to survive the FDA Drop Ball Test. Such shortened times would enable a lens dispenser to complete a lens prescription within one day.

Accordingly, the principal objective of the instant invention was to devise glass compositions capable of being chemically strengthened to high values of impact resistance at thicknesses not exceeding about 2 mm and preferably not exceeding about 1.5 mm, coupled with the development of a surface compression layer having a depth sufficient to survive the Drop Ball Test, within a period of time not exceeding about four hours.

Not only has there been a need for a glass lens composition capable of being chemically strengthened in much shorter times, but also for a glass composition containing very low levels of zinc, the preferred compositions being essentially free of zinc. Thus, optical and ophthalmic laboratories have been, and are continuing to be, under increasing pressure to reduce the level of zinc released in the effluent created by their finishing operations. At present, all of the glass white crown lenses and, consequently, the tinted ophthalmic and sunglass compositions based upon them contain substantial concentrations of zinc.

Therefore, a second objective of the subject invention was to not only design glass compositions suitable for optical and ophthalmic applications which can be chemically strengthened within about four hours, but also which will contain very low concentration of ZnO and CaO, the preferred glasses being essentially free of ZnO and CaO.

SUMMARY OF THE INVENTION

Those objectives can be achieved in base glass compositions consisting essentially, expressed in terms of weight percent on the oxide basis, of

| | | | |
|---|---|---|---|
| $SiO_2$ | 55-65 | CaO | 0-1.5 |
| $B_2O_3$ | 5-20 | MgO | 0-4 |
| $Al_2O_3$ | 4-10 | $TiO_2$ | 0-4 |
| $B_2O_3 + Al_2O_3$ | 14-26 | $ZrO_2$ | 0-7 |
| $Li_2O$ | 0-3 | $MgO + TiO_2 + ZrO_2$ | 0-10 |
| $Na_2O$ | 6-18 | $As_2O_3$ | 0-0.5 |
| $K_2O$ | 2-10 | ZnO | 0-1.5 |
| $Li_2O + Na_2O + K_2O$ | 13-22. | | |

Ophthalmic lenses fashioned from the above-outlined compositions exhibit very acceptable mechanical strengths after ion exchange treatments ($K^+$ ions for $Na^+$ ions) of less than four hours, with the preferred glasses requiring only about two hours. With glass compositions containing $Li_2O$, a bath containing a mixture of molten $Na^+$ and $K^+$ salts may be utilized. The $Na^+$ ion-for-$Li^+$ ion exchange proceeds more rapidly than the exchange of $K^+$ ions for $Na^+$ ions.

The glass compositions are preferably essentially CaO-free and ZnO-free; i.e., no substantial quantity of either is purposefully included in the compositions. Accordingly, the inventive compositions are highly responsive to chemical strengthening and help the optical laboratories to meet local restrictions on zinc contaminated effluent.

Where desired, the inventive glass compositions may be tinted utilizing colorants well known in the glass art such as $Co_3O_4$, $Cr_2O_3$, CuO, $Fe_2O_3$, $MnO_2$, NiO, $V_2O_5$, Au, Pd, and rare earth metal oxides in customary amounts. Not only may the inventive glasses be tinted, but also through the use of conventional additives can be made highly absorptive of radiation in the ultraviolet portion of the radiation spectrum. Table II recites an analysis of Code 8015 in weight percent and cation percent, marketed by Corning Incorporated, Corning, N.Y., as an ultraviolet radiation-absorbing, neutral gray, fixed tint glass.

TABLE II

| | Weight % | Cation % | | Weight % | Cation % |
|---|---|---|---|---|---|
| $SiO_2$ | 68.41 | 63.45 | $Fe_2O_3$ | 5.54 | 3.87 |
| $Al_2O_3$ | 0.51 | 0.56 | $Co_3O_4$ | 0.021 | 0.046 |
| $Na_2O$ | 8.81 | 15.84 | NiO | 0.126 | 0.094 |
| $K_2O$ | 9.71 | 11.49 | $As_2O_3$ | 0.111 | 0.063 |
| ZnO | 6.76 | 4.63 | | | |

Code 8015 is one of only a few neutral gray tinted glasses that meet the stringent requirement of fixed tint sunglasses that they will not, at the thickness used, transmit more than about 1% of ultraviolet radiation at a wavelength of 380 nm (3800 Å) at the thickness used. Therefore, a third objective of the present invention was to prepare glass compositions which, at thicknesses of 2 mm and even as thin as about 1.5 mm, will transmit no more than 1% of ultraviolet radiation at a wavelength of 380 nm. That objective can be achieved by incorporating at least 3.5% by weight iron, expressed as $Fe_2O_3$, in the glass composition. Concentrations in excess of 6% by weight $Fe_2O_3$ may be included but with no substantive advantage. Levels no greater than about 5% are preferred.

A fourth objective was to compose glass compositions which, at thicknesses of 2 mm and as thin as about 1.5 mm, will not only transmit no more than 1% of ultraviolet radiation at a wavelength of 380 nm, but also will exhibit a neutral gray, fixed tint similar to that of Code 8015. It will be appreciated that $Fe_2O_3$ contents of 3.5% by weight and higher impart a distinct green coloration to a glass. Accordingly, to achieve the fourth objective a combination of cobalt, expressed as $Co_3O_4$, and nickel, expressed as NiO, as is illustrated above in Code 8015, is incorporated in the glass composition. In general, the addition of $Co_3O_4$ will range about 0.02-0.035% by weight and that of NiO will range about 0.08-0.2%. The appended drawing illustrates the preferred "color box" of chromaticity coordinates (x,y), as determined utilizing a conventional tristimulus colorimeter with Illuminant C, within which the neutral gray, fixed tint coloration of Code 8015 and comparable glasses will most desirably reside within that "color box", although glasses having colorations somewhat outside of the polygon can be useful where strict adherence to a neutral gray is not required. Thus, the desired neutral gray tint is encompassed within the Code 8015 target area S, T, U, V, W, X, Y, Z, S of the drawing, wherein Points S-Z designate the following x, y coordinates:

| | x | y |
|---|---|---|
| S | 0.3127 | 0.3468 |
| T | 0.3160 | 0.3470 |
| U | 0.3169 | 0.3446 |
| V | 0.3148 | 0.3410 |
| W | 0.3111 | 0.3383 |
| X | 0.3078 | 0.3381 |
| Y | 0.3069 | 0.3404 |
| Z | 0.3089 | 0.3440 |

To secure glasses displaying chromatically values approximating those of Code 8015, the cation ratio $Na_2O$:$K_2O$ in the inventive glasses must be maintained between about 2:1 to 3:1. Thus, it was found that increasing the $K_2O$ content of the inventive glasses in proportion to the $Na_2O$ content raises the luminous transmittance (Y) at the same glass thickness, or maintains the chromaticity values as the cross section of a lens is made thinner.

The most preferred base glass compositions are essentially free of CaO and ZnO and consist essentially, expressed in terms of weight percent on the oxide basis, of

| | | | |
|---|---|---|---|
| $SiO_2$ | 55–65 | $Li_2O + Na_2O + K_2O$ | 14–21 |
| $B_2O_3$ | 5–18 | MgO | 0–3 |
| $Al_2O_3$ | 5–10 | $TiO_2$ | 0–4 |
| $B_2O_3 + Al_2O_3$ | 14–25 | $ZrO_2$ | 0–6 |
| $Li_2O$ | 0–2 | $MgO + TiO_2 + ZrO_2$ | 0–8 |
| $Na_2O$ | 6–16 | $As_2O_3$ | 0–0.5. |
| $K_2O$ | 3–8 | | |

BRIEF DESCRIPTION OF APPENDED DRAWING

The appended drawing presents a plot of chromaticity coordinates on a color mixture diagram utilizing illuminant c.

PRIOR ART

In addition to U.S. Pat. No. 3,790,260 discussed above, the following patents are believed to be of interest:

U.S. Pat. No. 3,010,836 (Upton et al.) discloses glasses especially designed for use in sunglasses which, at a thickness of 2 mm, transmit 0% ultraviolet radiation at wavelengths of 370 nm and below and exhibit a neutral gray coloration. Those glasses consisted essentially, in weight percent, of:

| | | | | | |
|---|---|---|---|---|---|
| $SiO_2$ | 52–62 | FeO | 1–4 | MgO | 0–1 |
| $K_2O$ | 10–15 | $Al_2O_3$ | 0–3 | $Na_2O$ | 0–8 |
| $B_2O_3$ | 15–20 | $ZrO_2$ | 0–7 | $Li_2O$ | 0–4 |
| ZnO | 1–9 | | | | |

Iron oxide comprised the sole colorant and was present in the reduced state (FeO). ZnO is a required component, the $K_2O$ level is above that in the inventive glasses, and the $Al_2O_3$ content is too low.

U.S. Pat. No. 4,259,118 (Sack) is directed to glass compositions demonstrating good chemical durability and high heat stress factor consisting essentially, in weight percent, of

| | | | | | |
|---|---|---|---|---|---|
| $SiO_2$ | 61.6–79.5 | $ZrO_2$ | 0–15 | MgO | 0–3.19 |
| $B_2O_3$ | 1.0–10.5 | $As_2O_3$ | 0–0.5 | BaO | 0–9.6 |
| $Al_2O_3$ | 2.5–14.0 | NaCl | 0–0.75 | ZnO | 0–12.0 |
| $Na_2O$ | 1.5–6.0 | CaO | 0–4.2 | $CaO + MgO + BaO + ZnO$ | 3.2–17.9 |

$K_2O$ is nowhere mentioned.

U.S. Pat. No. 4,562,161 (Mennemann et al.) claims optical and ophthalmic glass compositions consisting essentially, in weight percent, of

| | | | |
|---|---|---|---|
| $SiO_2$ | 49–68 | $TiO_2$ | 5–12.8 |
| $B_2O_3$ | 3–8 | $ZrO_2$ | 0–6 |
| $Al_2O_3$ | 0.5–3 | $Nb_2O_5$ | 0.15–5 |
| $P_2O_5$ | 0–1.5 | CaO | 2–6 |
| $SiO_2 + B_2O_3 + Al_2O_3 + P_2O_5$ | 60–78 | MgO | 0–3 |
| $Li_2O$ | 3–8 | SrO | 0–4 |
| $Na_2O$ | 4–10 | BaO | 0–4 |
| $K_2O$ | 0–10 | ZnO | 0–2.97 |
| $Li_2O + Na_2O + K_2O$ | 9–17 | $CaO + MgO + SrO + BaO + ZnO$ | 1.5–6 |
| $Y_2O_3$ | 0–3 | F | 0–3 |

The $Al_2O_3$ content is less than the minimum required in the present inventive glasses and the $TiO_2$ level exceeds the maximum permitted in the inventive glasses. Furthermore, CaO is present in the preferred glass compositions.

U.S. Pat. No. 4,565,791 (Boudot et al.) claims ophthalmic glass compositions consisting essentially, in weight percent, of

| | | | | | |
|---|---|---|---|---|---|
| $SiO_2$ | 54–70 | $Li_2O$ | 0.5–3 | $ZrO_2$ | 0–2 |
| $B_2O_3$ | 9–22 | $Na_2O$ | 3–9 | $As_2O_3$ | 0.1–0.5 |
| $Al_2O_3$ | 3–10 | $K_2O$ | 3–10 | Cl | 0.2–0.7 |
| $TiO_2$ | 4–6 | $Li_2O + Na_2O + K_2O$ | 10–13 | | |

The $TiO_2$ concentration is greater than the maximum allowed in the present inventive glasses and the total $Li_2O + Na_2O + K_2O$ level is below that required in the inventive glasses.

U.S. Pat. No. 4,768,859 (Kasori et al.) claims compositions for cladding glasses for optical fibers consisting essentially, in weight percent, of

| | | | |
|---|---|---|---|
| $SiO_2$ | 60–80 | Alkaline earth metal oxide | 0–8 |
| $B_2O_3$ | 7–12 | ZnO | 0–7 |
| $Al_2O_3$ | 4–7 | $ZrO_2$ | 0–7 |
| $Li_2O$ | 2–4 | $TiO_2$ | 0–7 |
| $Na_2O$ | 6–8 | $ZnO + ZrO_2 + TiO_2$ | >0–7 |
| $K_2O$ | 3.5–6 | F | >0–3 |
| $Li_2O + Na_2O + K_2O$ | 9–17 | | |

There is no reference to optical/ophthalmic lenses; fluoride comprises no component of the present inventive glasses; and the preferred glasses appear to contain CaO and/or ZnO.

U.S. Pat. No. 4,824,801 (Yokoi et al.) describes compositions for glass fivers consisting essentially, in weight percent, of

| | | | |
|---|---|---|---|
| $SiO_2$ | 45–65 | $CaO + MgO + ZnO$ | 4–10 |
| $B_2O_3$ | 13–30 | $Li_2O + Na_2O + K_2O$ | 0–5 |
| $Al_2O_3$ | 9–20 | | |

There is no reference to optical/ophthalmic lenses; the alkali metal oxide content is far below the minimum demanded in the present inventive glasses; and each of the working examples provided in the patent contained CaO plus several also contained ZnO.

U.S. Pat. No. 4,925,814 (Fine) is concerned with glasses exhibiting excellent transmission in the ultraviolet region of the radiation spectrum consisting essentially, in weight percent, of

| | | | |
|---|---|---|---|
| $SiO_2$ | 61-69 | $Na_2O$ | 3-5.25 |
| $B_2O_3$ | 18-22 | $K_2O$ | 0-3 |
| $Al_2O_3$ | 1.5-12 | Cl | 0-1 |
| $Li_2O$ | 0.5-3 | | |

There is no reference to optical/ophthalmic lenses; the alkali metal oxide content is below the minimum required in the present inventive glasses; and MgO, $TiO_2$, and $ZrO_2$ are nowhere mentioned.

DESCRIPTION OF PREFERRED EMBODIMENTS

Table I provides several glass compositions illustrating the present invention. The compositions are recorded in terms of parts by weight on the oxide basis. However, inasmuch as the sum of the individual components very closely approaches 100, for all practical purposes the reported values may be deemed to represent weight percent. Table IA records the same compositions expressed in terms of cation percent on the oxide basis. The actual batch ingredients for preparing the glasses can comprise any materials, either oxides or other compounds, which, when melted together, will be converted into the desired oxide in the proper proportions. For example, $Na_2CO_3$ and $K_2CO_3$ can constitute the source of $Na_2O$ and $K_2O$, respectively.

The batch ingredients were compounded, thoroughly mixed together to assist in securing a homogeneous melt, and charged into platinum crucibles. The crucibles were moved into a furnace operating at about 1450° C., the batches melted for about 4 hours, the melts poured into steel molds to produce rectangular glass slabs having dimensions of about 10"×4"×0.5" (~25.4×10.2×1.3 cm), and those slabs transferred immediately to an annealer operating at about 500° C. Other glass articles were prepared by melting batches in a laboratory continuous melting unit.

Test samples were cut from the articles for such physical measurements as softening point, annealing point, strain point, linear coefficient of thermal expansion, and density. Measurements of chromaticity, transmittance at a wavelength of 380 nm, and ball drop heights were conducted on ground and polished plates or curved lenses of 1.5 mm and 2.0 mm thickness.

Whereas the above description reflects laboratory melting and forming practice only, it must be recognized that the glass compositions recited in Table I complying with the parameters of the present invention can be melted and formed in much larger amounts utilizing conventional commercial glass melting units and glass forming equipment and techniques. It is only necessary that glass batches of the required formulations be prepared, those batches fired at a temperature and for a time sufficient to achieve homogeneous melts, and those melts then cooled and shaped into glass articles of desired configurations.

TABLE I

| | 1 | 2 | 3 | 4 | 5 |
|---|---|---|---|---|---|
| $SiO_2$ | 63.3 | 56.1 | 60.3 | 59.9 | 59.8 |
| $B_2O_3$ | 6.59 | 17.0 | 6.49 | 6.45 | 6.43 |
| $Al_2O_3$ | 9.25 | 6.07 | 9.16 | 9.10 | 9.08 |
| $Na_2O$ | 15.10 | 7.68 | 14.9 | 13.6 | 12.3 |
| $K_2O$ | 3.75 | 5.98 | 3.76 | 5.61 | 7.46 |
| $TiO_2$ | — | 2.72 | — | — | — |
| $ZrO_2$ | 1.24 | 4.89 | 1.23 | 1.22 | — |
| $Fe_2O_3$ | — | — | 3.82 | 3.80 | 4.58 |
| $Co_3O_4$ | — | — | 0.0276 | 0.0279 | 0.0318 |
| NiO | — | — | 0.100 | 0.102 | 0.14 |
| $As_2O_3$ | 0.20 | — | 0.162 | 0.118 | 0.117 |

TABLE IA

| | 1 | 2 | 3 | 4 | 5 |
|---|---|---|---|---|---|
| $SiO_2$ | 52.30 | 47.1 | 50.3 | 50.3 | 50.3 |
| $B_2O_3$ | 9.39 | 6.0 | 9.34 | 9.34 | 9.34 |
| $Al_2O_3$ | 9.00 | 6.0 | 9.00 | 9.00 | 9.00 |
| $Na_2O$ | 24.10 | 6.4 | 24.1 | 22.1 | 20.1 |
| $K_2O$ | 4.00 | 6.4 | 4.0 | 6.0 | 8.0 |
| $TiO_2$ | — | 2.0 | — | — | — |
| $ZrO_2$ | 0.50 | 2.0 | 0.50 | 0.50 | — |
| $Fe_2O_3$ | — | — | 2.40 | 2.40 | 2.90 |
| $Co_3O_4$ | — | — | 0.017 | 0.018 | 0.020 |
| NiO | — | — | 0.067 | 0.068 | 0.095 |
| $As_2O_3$ | 0.04 | — | 0.080 | 0.060 | 0.060 |

$As_2O_3$ is present in the above compositions to perform its conventional function as a fining agent, but other fining techniques may also be used.

Table II lists softening points (S.P.), annealing points (A.P.), and strain points (St.P) in °C., linear coefficients of thermal expansion (Exp) over the temperature range 25°-300° C. expressed in terms of $\times 10^{-7}$/°C., densities (Den) in grams/cm$^3$, percent transmittance (Trans) at a wavelength of 380 nm at a thickness of 2 mm for Examples 3, 4, and 8015 and at a thickness of 1.5 mm for Examples 5 and 8015, and chromaticity values (Y,x,y) for Examples 3, 4, and 8015 at a thickness of 2 mm and for Example 5 at a thickness of 1.5 mm as determined utilizing techniques conventional in the glass art. Examples 1 and 2 represent clear, uncolored ophthalmic lenses.

TABLE II

| | 1 | 2 | 3 | 4 | 8015 (2 mm) | 8015 (1.5 mm) | 5 |
|---|---|---|---|---|---|---|---|
| S.P. | 706 | 713 | — | — | 688 | 688 | — |
| A.P. | 542 | 532 | — | — | 490 | 490 | — |
| St. P. | 503 | 490 | — | — | 450 | 450 | — |
| Exp | 91.4 | 70.8 | — | — | 96.7 | 96.7 | — |
| Den | 2.484 | 2.431 | — | — | 2.559 | 2.559 | — |
| Trans | — | — | 0.31 | 0.43 | 1.07 | 3.21 | 0.54 |
| Y | — | — | 14.3 | 16.39 | 18.91 | 28.61 | 18.77 |
| x | — | — | 0.3101 | 0.3090 | 0.3120 | 0.3121 | 0.3163 |
| y | — | — | 0.3448 | 0.3404 | 0.3426 | 0.3365 | 0.3443 |

As is immediately evident from Table II and as graphically illustrated in the appended drawing, the chromaticity values demonstrated by the inventive glasses can be adjusted to essentially match those of Code 8015 at a thickness of 2 mm, and the inventive glasses transmit less ultraviolet radiation at 380 nm. It is also of interest to note that the chromaticity values of Code 8015 at a thickness of 1.5 mm fall outside of the preferred target "color box" in the appended drawing, whereas those values for Example 5 at a thickness of 1.5 mm are included therewithin. Moreover, the ultraviolet transmittance of Code 8015 glass at a thickness of 1.5 mm exceeds the permitted maximum by more than three-fold, whereas that of Example 5 at a thickness of 1.5 mm is about one-half of the permitted maximum.

Ground and polished lenses of varying thickness of Code 8015 and Examples 3 and 5 were immersed for two hours in a bath of molten KNO₃ operating at 450° C. The lenses were withdrawn from the bath, the salt washed off in tap water, and then dried. The samples were divided into two groups, the members of one group being subjected to the following abrading action to simulate customarily received abuse in service, and the other not. The abrading procedure consisted of subjecting the lenses to the American Optical tumbling procedure, the ophthalmic glass industry standard procedure for abrading lenses to simulate surface abuse during service. Table III records the thickness of each sample, whether the sample had been abraded prior to the test, and the mean failure height (MFH) measured over a total of 25 lenses of each glass, along with the standard deviation in the measurements (Std.Dev.). Code 8015 is included for comparison purposes.

TABLE III

| Glass | Thickness | Abraded | MFH | Std. Dev. |
|---|---|---|---|---|
| 3 | 2.05 mm | No | 27.1' (~8.3 m) | 5.4' (~1.65 m) |
|   | 2.06 mm | Yes | 19.8' (~6 m) | 4.3' (~1.3 m) |
| 3 | 1.53 mm | No | 21.9' (~6.7 m) | 4.5' (~1.4 m) |
|   | 1.54 mm | Yes | 13.2' (~4 m) | 2.9' (~0.9 m) |
| 5 | 1.49 mm | No | 18.2' (~5.5 m) | 3.5' (~1.1 m) |
|   | 1.52 mm | Yes | 10.9' (~3.3 m) | 2.1' (~0.6 m) |
| 8015 | 2.07 mm | No | 18.6' (~5.7 m) | 4.6' (~1.4 m) |
|   | 2.03 mm | Yes | 12.4' (~3.8 m) | 2.2' (~0.7 m) |
| 8015 | 1.53 mm | No | 18.6' (~5.7 m) | 5.5' (~1.7 m) |
|   | 1.54 mm | Yes | 7.6' (~2.3 m) | 1.5' (~0.5 m) |

As is immediately evident, the glasses of the present invention demonstrate a significant strength advantage when compared to Code 8015 glass. That strength advantage is particularly evident in thin cross sections. Thus, the strengths of Examples 3 and 5 at a thickness of 1.5 mm far exceed that of Code 8015 at 1.5 mm.

Example 5 is the most preferred inventive embodiment.

We claim:

1. A transparent glass capable of being chemically strengthened within a period of time not exceeding four hours to develop a surface compression layer of sufficient depth to survive the Drop Ball Test after abrasion and which, at a thickness of 2.0 mm does not transmit more than about 1% of ultraviolet radiation at a wavelength of 380 nm, said glass having a composition which consists essentially, expressed in terms of weight percent on the oxide basis, of

| | | | |
|---|---|---|---|
| $SiO_2$ | 55–65 | CaO | 0–1.5 |
| $B_2O_3$ | 5–20 | MgO | 0–4 |
| $Al_2O_3$ | 4–10 | $TiO_2$ | 0–4 |
| $B_2O_3 + Al_2O_3$ | 14–26 | $ZrO_2$ | 0–7 |
| $Li_2O$ | 0–3 | $MgO + TiO_2 + ZrO_2$ | 0–10 |
| $Na_2O$ | 6–18 | $As_2O_3$ | 0–0.5 |
| $K_2O$ | 2–10 | ZnO | 0–1.5 |
| $Li_2O + Na_2O + K_2O$ | 13–22 | $Fe_2O_3$ | 3.5–5.5. |

2. A transparent glass according to claim 1 which exhibits a neutral gray, fixed tint bounded by Points S, T, U, V, W, X, Y, Z, S of the drawing also contains 0.02–0.035% $Co_3O_4$ and 0.08–0.2% NiO and the cation ratio $Na_2O:K_2O$ is between about 2:1 to 3:1.

3. A transparent glass according to claim 1 which, at a thickness of 1.5 mm does not transmit more than about 1% of ultraviolet radiation at a wavelength of 380 nm, is essentially free of ZnO and CaO, and consists essentially of

| | | | |
|---|---|---|---|
| $SiO_2$ | 55–65 | $Li_2O + Na_2O + K_2O$ | 14–21 |
| $B_2O_3$ | 5–18 | MgO | 0–3 |
| $Al_2O_3$ | 5–10 | $TiO_2$ | 0–4 |
| $B_2O_3 + Al_2O_3$ | 14–25 | $ZrO_2$ | 0–6 |
| $Li_2O$ | 0–2 | $MgO + TiO_2 + ZrO_2$ | 0–8 |
| $Na_2O$ | 6–16 | $As_2O_3$ | 0–0.5 |
| $K_2O$ | 3–8 | $Fe_2O_3$ | 3.5–5.5. |

4. A transparent glass according to claim 3 which exhibits a neutral gray, fixed tint bounded by Points S, T, U, V, W, X, Y, Z, S of the drawing also contains 0.02–0.035% $Co_3O_4$ and 0.1–0.15% NiO.

* * * * *